(12) United States Patent
Campbell

(10) Patent No.: US 12,712,484 B2
(45) Date of Patent: Aug. 18, 2026

(54) SYSTEMS AND METHODS FOR PROTECTING A SOLAR MODULE

(71) Applicant: Terabase Energy, Inc., Berkeley, CA (US)

(72) Inventor: Matthew Paul Campbell, Berkeley, CA (US)

(73) Assignee: Terabase Energy, Inc., Berkeley, CA (US)

( * ) Notice: Subject to any disclaimer, the term of this patent is extended or adjusted under 35 U.S.C. 154(b) by 156 days.

(21) Appl. No.: 18/513,973

(22) Filed: Nov. 20, 2023

(65) Prior Publication Data

US 2025/0167723 A1 May 22, 2025

(51) Int. Cl.

| | |
|---|---|
| ***H02S 30/10*** | (2014.01) |
| ***H02S 20/30*** | (2014.01) |
| ***H02S 20/32*** | (2014.01) |

(52) U.S. Cl.

CPC .............. *H02S 30/10* (2014.12); *H02S 20/30* (2014.12)

(58) Field of Classification Search

CPC ........... H02S 30/10; H02S 20/32; H02S 20/30

See application file for complete search history.

(56) References Cited

U.S. PATENT DOCUMENTS

| | | | | |
|---|---|---|---|---|
| 5,769,068 | A * | 6/1998 | Takahashi | F24S 25/50 126/696 |
| 12,160,197 | B1 * | 12/2024 | Duggal | H02S 40/00 |
| 2024/0305237 | A1 * | 9/2024 | Larner | H02S 20/10 |
| 2025/0392251 | A1 * | 12/2025 | Hansel | H02S 20/32 |

FOREIGN PATENT DOCUMENTS

| | | | | |
|---|---|---|---|---|
| CN | 109245694 | | * | 1/2019 |
| CN | 215808362 | U | | 8/2021 |
| CN | 114866000 | A | | 8/2022 |
| DE | 102010014016 | A1 | | 10/2011 |

OTHER PUBLICATIONS

International Search Report and Written Opinion of the International Searching Authority mailed Jan. 22, 2025 in related PCT application No. PCT/US2024/056507, (9 pgs).

* cited by examiner

*Primary Examiner* — Jayne L Mershon

(74) *Attorney, Agent, or Firm* — Michael North

(57) ABSTRACT

Solar panels in a solar farm may suffer damage from severe hail damage during operation. Damaged solar panels need to be repaired or replaced. Given that a solar farm is typically located in remote areas, service or replacement will inevitably take extra time and effort, resulting in additional costs. The present invention discloses systems and methods for solar module protection using protective screens covering the back sides of the solar panels to avoid or minimize severe environmental impacts. Solar panels may be rotated to a protective position with their backsides and protective screens oriented upward. Such implementation provides a practical solution to protect the solar panels from hail damage, and thus, the need for costly repairs or replacement may be avoided or minimized. As a result, the economic efficiency of solar farm operations may be improved significantly.

7 Claims, 16 Drawing Sheets

500

1500

SYSTEMS AND METHODS FOR PROTECTING A SOLAR MODULE

TECHNICAL FIELD

The present disclosure relates generally to solar module protection. More particularly, the present disclosure relates to systems and methods for solar module protection against severe environmental impacts.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is the safety management of installed solar modules to maintain operation efficiency.

In a solar farm, multiple solar panels are securely aligned and attached to a structure to form a row of solar panels. Most solar power plants utilize tracking structures which follow the sun's movement to maximize energy production. A solar farm may comprise one or more solar arrays, with each solar array having multiple rows of solar modules. A row of solar modules may be supported by ground piles with the tracking structure fastened to ground piles at a desired rotational angle such that the solar panels are oriented for maximum energy production efficiency. Considering of installation cost, a solar farm is typically located in a remote area.

A solar farm may suffer damage from severe environmental impacts during operation. Hail is one issue that could significantly impact the safety of solar farm operations. In recent years, solar panel damage from hail has caused hundreds of millions of dollars in damage to various solar farms.

When solar panels are damaged from hail, the solar panels need to be repaired or replaced. Given that solar farms are typically located in remote areas, service or replacement will inevitably take extra effort, which results in additional costs for solar farm operations considering the offline time for those damaged solar panels. Accordingly, solar deployments in the hail regions, such as Texas, necessitate solutions to the hail problem.

What is needed are systems, devices, and methods for solar module protection against severe environmental impacts.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

DETAILED DESCRIPTION OF EMBODIMENTS

Figure 1:
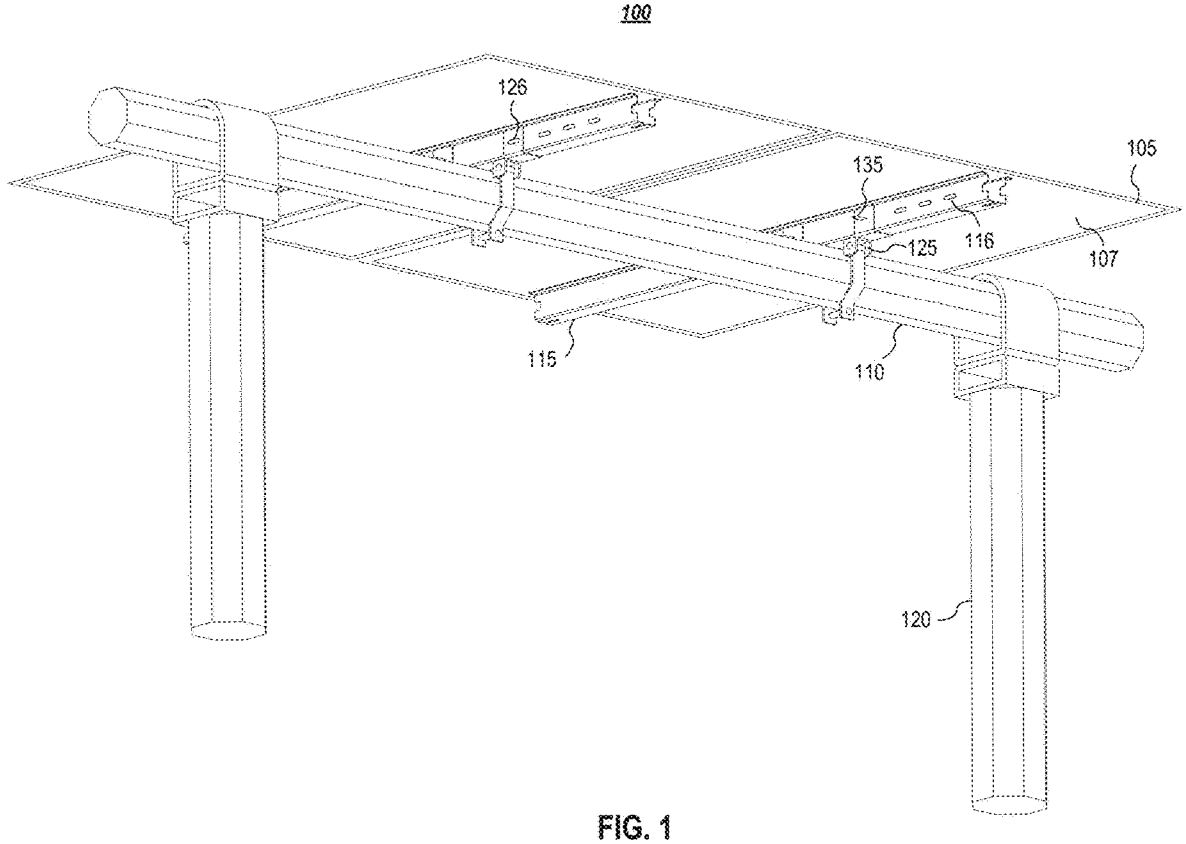
FIG. 1 depicts a solar module comprising multiple solar panels in an operative position, in accordance with various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method.

Components, or features, shown in diagrams are illustrative of exemplary embodiments of the invention and are meant to avoid obscuring the invention. It shall also be understood that throughout this discussion, components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of protective screens of a solar module.

Furthermore, connectivity between components or systems within the figures is not intended to be limited to direct connections. Also, components may be integrated together or be discrete prior to installation of a solar module.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different protective screens; and (4) certain functions may be performed concurrently or in sequence.

Furthermore, it shall be noted that many embodiments described herein are given in the context of the assembly and installation of large numbers of solar panels within a system, but one skilled in the art shall recognize that the teachings of the present disclosure may apply to other large and complex construction sites in which repair or replacement service and personnel are challenging to be provided in real-time.

In this document, the term "solar module" refers to a structural assembly comprising one or more photovoltaic (PV) or solar panels and/or one or more frames (or purlins) for module support. Some types of solar panels may have electrical harnesses and supplemental structure that allows them to connect to other solar panels or foundations/piles while other types do not have this supplemental structure.

FIG. 1 shows a solar module comprising multiple solar panels in an operative position in accordance with various embodiments of the invention. Multiple solar panels 105 are securely aligned and attached to a shaft or torque tube 110 to form a row of solar panels, which are supported by ground piles 120. The torque tube is securely fastened to the ground piles and may be fixed at a desired rotational angle or be rotatable during operation such that the solar panels can operate under maximum energy production efficiency. To securely attach a solar panel to a torque tube, one or more panel frames (or purlins) 115 of the solar panel are firmly connected to a mounting bracket 125, which is firmly clamped or coupled to the torque tube 110. The panel frame 115 may have multiple slots 116, and the mounting bracket 125 has at least one set of slots 126. The mounting bracket 125 may be aligned to a desired mounting position and be securely attached to a panel frame 115 using a wedge 135 through the slots of the mounting bracket 125 and the panel frame 115.

Each solar panel 105 has a front side 106 (shown in FIG. 2) and a back side 107. The front side 106 may also be referred to as an active side for photovoltaic conversion. The back side may be a nonactive side, or a secondary active side capable of performing photovoltaic conversion, although the secondary active side is not as efficient as the front side. In the operative position, the front side 106 is oriented toward the Sun for direct photovoltaic conversion. It shall be noted that the operative position may or may not be fixed, as the solar panels may be rotated with fine orientation angle adjustment for optimum energy conversion efficiency in certain embodiments.

Figure 2:
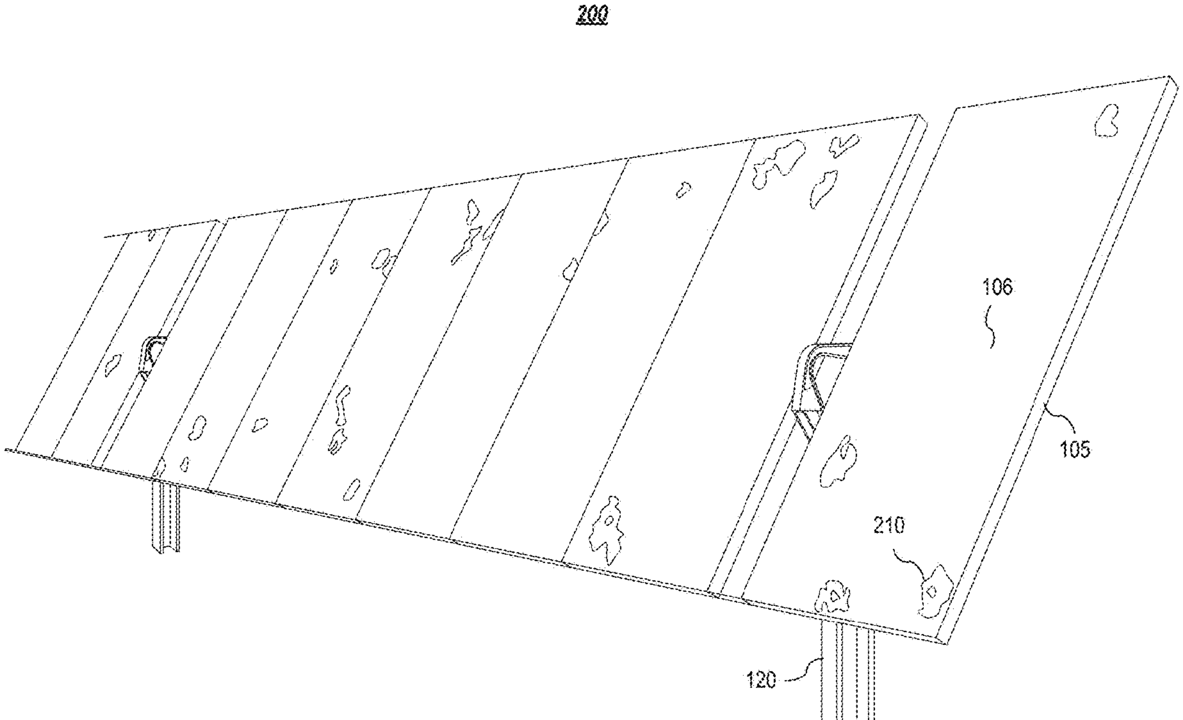
FIG. 2 depicts a solar module damaged during a hailstorm.

A solar farm may suffer damage from severe environmental impacts during operation. Hail is an issue that could significantly impact the safety of solar farm operations. Various measures have been taken to minimize hail impact. FIG. 2 depicts a solar module damaged during a hailstorm, even though the solar panels are rotated to an angle, e.g., a high angle relative to the ground of 60-75 degrees, with less exposure to hail impact. In a hailstorm, wind blows hail stones laterally making the angle of impact unpredictable and solar panels stowed at high angles have experienced catastrophic damage. As shown in FIG. 2, the solar panels having hail damage 210 need to be repaired or replaced.

Since most solar farms are located in remote areas, service or replacement will inevitably take extra effort, which results in additional costs for solar farm operations besides the extra offline time for those damaged solar panels. Accordingly, solar deployments in the hail regions, such as Texas, necessitate solutions to the hail problem.

Described hereinafter are systems and methods embodiments for solar module protection against severe environmental impacts. Implementing solar module protection provides a practical solution to protect solar panels from damage. Thus, the need for costly repair or replacement may be avoided or minimized. As a result, the economic efficiency of solar farm operations may be improved significantly.

Figure 3:
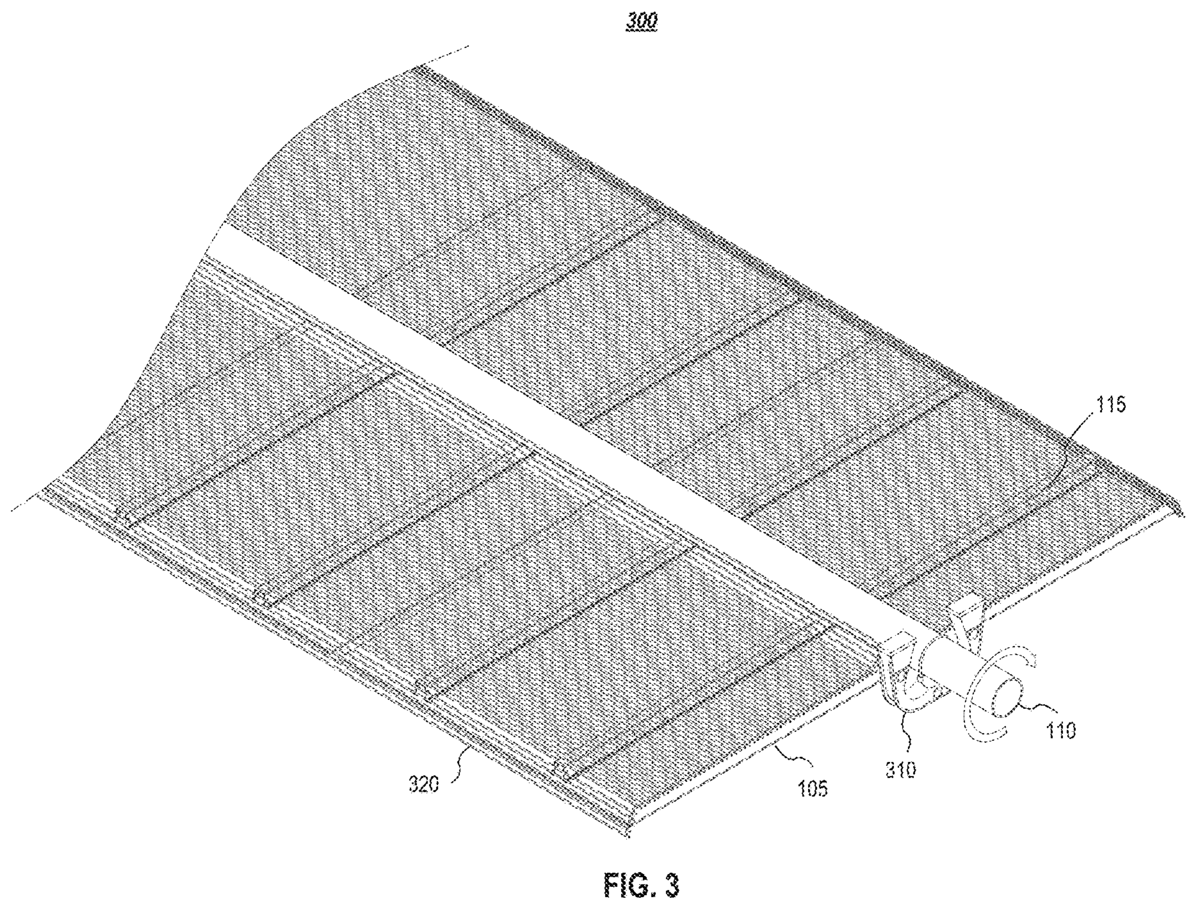
FIG. 3 depicts a solar module rotated to a protective position with solar panel backsides oriented upward to prevent potential damage during a hailstorm, in accordance with various embodiments of the invention.

FIG. 3 depicts a solar module rotated to a protective position with solar panel backsides oriented upward to prevent potential damage during a hailstorm, in accordance with various embodiments of the invention. As shown in FIG. 3, the backside of the solar panel 105 is covered with one or more screens 320, which may be a singular piece covering all solar panels of the solar module or be separate pieces to cover the back side of each solar panel, respectively.

The toque tube of the solar module may be rotated automatically or manually. The supporting structure 310 for the torque tube 110 may be a bearing or a bracket comprising gears that may be driven electrically by a motor to rotate the torque tube to a desired position, e.g., an operative position or a protective position.

In one or more embodiments, the one or more screens 320 are porous, allowing sunlight to pass through partially. The size of holes may be determined, e.g., with diameters less than 1 inch, to block large hail stones in a severe thunderstorm. Smaller hail stones that can pass through the holes and touch the screens are less likely to cause severe damage due to the limited kinetic energy of those smaller hail stones. Given the back side of a solar panel is not an active side or just a secondary active side, the impact on overall photovoltaic conversion efficiency for the solar module is limited. Furthermore, the porous structure allows air flow to keep cooling the solar panels, which is very advantageous to keep the solar panel operating at a high photovoltaic conversion efficiency.

The screens may be made of various materials, such as nylon, polytetrafluoroethylene (PTFE), polyethylene (PE), polyethylene terephthalate (PET), aluminum, steel, copper, or other plastics/metals. Given that the screens are used outdoors in a remote solar farm, it may be preferred that a steel wire mesh, such as a "chicken wire" or "hardware cloth", is used for the screen. A steel wire mesh has the advantages of being low-cost, lightweight, anti-aging and anti-corrosion, durable with a long useful lifespan that may be consistent with that of the solar panels and supporting structures, etc. The steel wire mesh allows substantial sunlight to reach the back of the panel (with less impact on overall photovoltaic conversion efficiency) and good airflow to cool the operating solar panels.

The screens may act as a spring absorbing energy from hail stones and deflecting them away from the panel. The screens may be supported by a frame, battens, tension cables, or other mechanisms to keep a space between the screens and the back side of the solar panels so that large hail stones do not touch the panel directly or touch the panel with energy much less likely to cause damage. Depending on specific screen embodiments, the space between the screens and the back side of the solar panels may or may not be uniform across the screens.

The screens may be structurally secured to a solar module with fasteners but may also be temporarily removed to accommodate solar panel service or replacement. The screens may be enclosed on all sides to prevent nesting birds or other animals behind the panels. In one or more embodiments, an overhang may extend on one or both sides of a solar panel to prevent the top edge of the solar panel from receiving a hail impact. FIGS. 4-9 depict different views of various embodiments of screen protection, in accordance with various embodiments of the invention.

Figure 4:
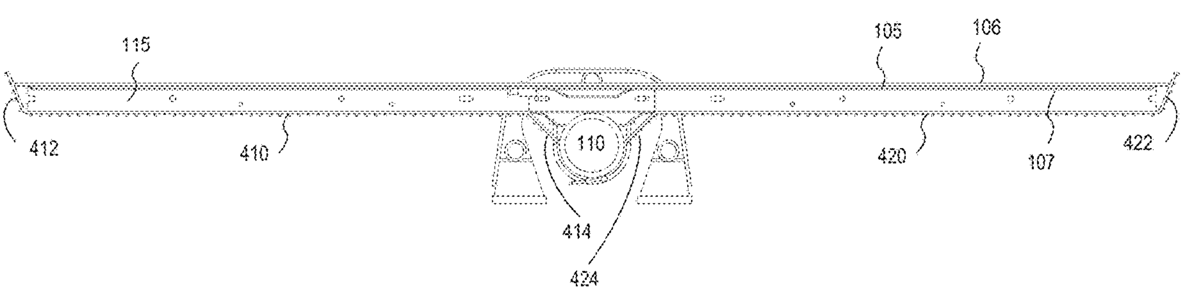
FIG. 4 depicts a side view of an embodiment of screen protection, in accordance with various embodiments of the invention.

A side view of an embodiment of screen protection is shown in FIG. 4. The solar module is in an operative position, with the front side 106 facing upward and the back side 107 facing downward. A first screen 410 and a second screen 420 are placed, respectively, on one side of the torque tube 110 to cover the entire back side of all solar panels jointly. The screens 410 and 420 are attached to the panel purlins 115 for a relatively uniform space between the screens and the back side of the solar panels. The first screen 410 comprises a first edge overhang 412 extending beyond the solar panel 105 and a first central overhang 414 extending toward the torque tube 110. Similarly, the second screen 420 comprises a second edge overhang 422 extending beyond the solar panel 105 and a second central overhang 424 extending toward the torque tube 110. The edge overhangs and the central overhangs ensure complete covering for the back side 107 of the solar panel for full protection.

Figure 5:
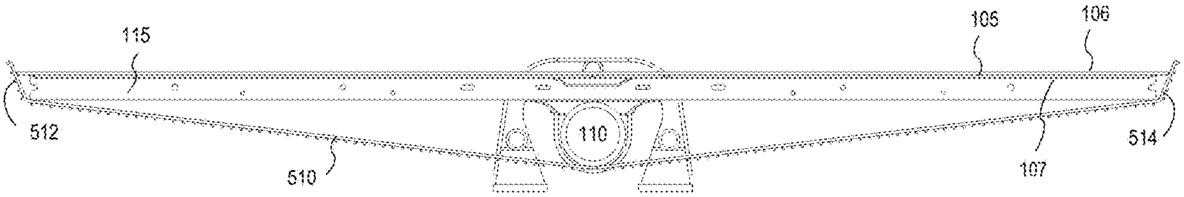
FIG. 5 depicts a side view of another embodiment of screen protection, in accordance with various embodiments of the invention.

FIG. 5 depicts a side view of another embodiment of screen protection, in accordance with various embodiments of the invention. Similar to the embodiment shown in FIG. 4, the solar module in FIG. 5 is in an operative position, with the front side 106 facing upward and the back side 107 facing downward. As shown in FIG. 5, a single screen 510 wraps around the torque tube 110 to fully cover the back side 107 of the solar panel. The single screen 510 comprises a first edge overhang 512 and a second edge overhang 514 extending beyond the solar panel 105 to prevent the top edge of the solar panel from hail impact. Since the screen 510 wraps around the torque tube 110, the space between the screen 510 and the back side 107 of the solar panels is nonuniform, with less gap toward the edges.

Figure 6:
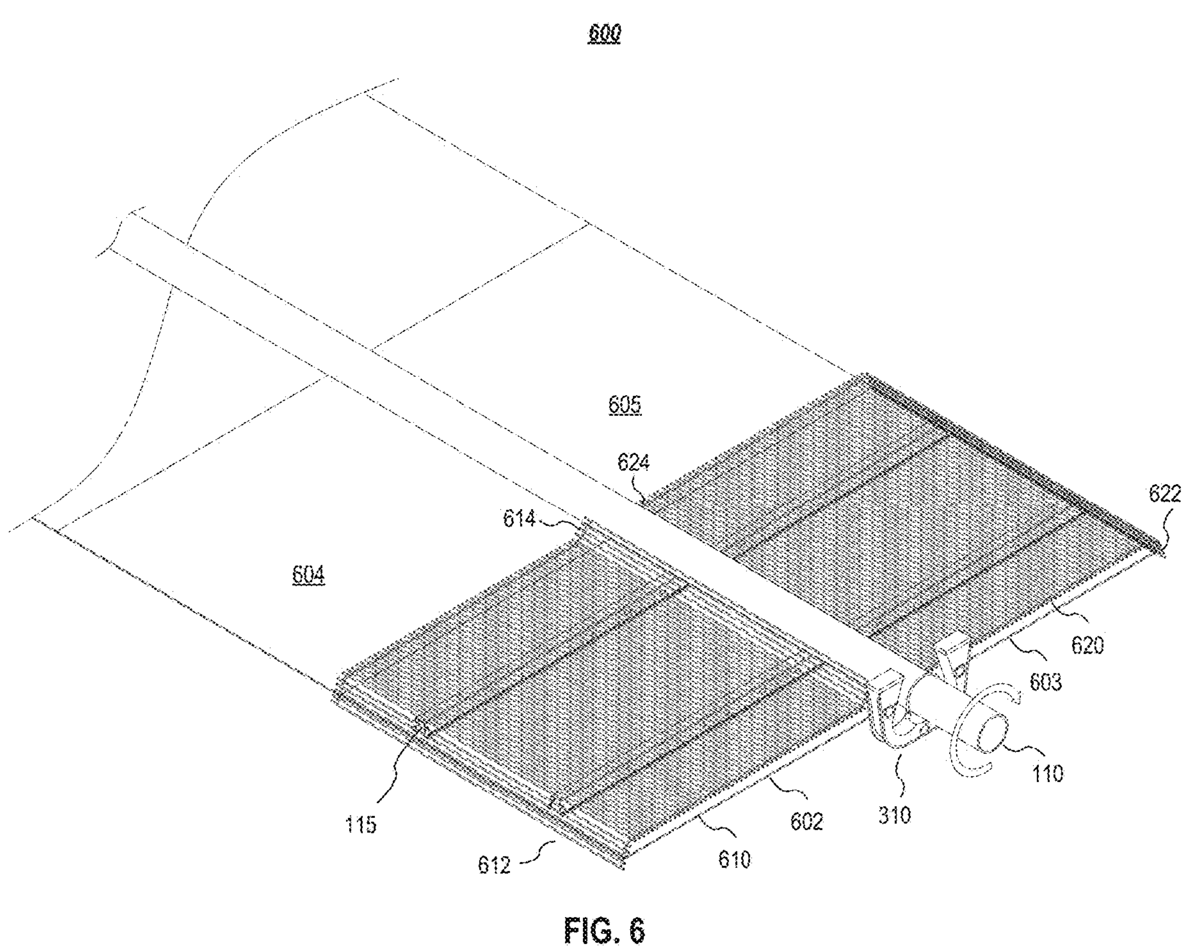
FIG. 6 depicts a perspective view of an embodiment of screen protection, in accordance with various embodiments of the invention.

FIG. 6 depicts a perspective view of an embodiment of screen protection, in accordance with various embodiments of the invention. A first screen 610 and a second screen 620 are placed respectively on one side of the torque tube 110 for a full-width cover of the entire back side of all solar panels. Different from the embodiment shown in FIG. 3, the first screen 610 and the second screen 620 do not have full-length coverage. Instead, the first screen 610 just provides protection for the first solar panel 602, while the second screen 620 just provides protection for the second solar panel 604. For the purpose of visual comparison, no screens are placed above the solar panels 604 and 605. If one solar panel has hail damage, a service personnel only needs to replace the damaged solar panel and the specific individual screen covering the damaged solar panel instead of one large screen covering all solar panels. Such an arrangement of separate screen protection might be convenient and cost-efficient for maintenance or service.

Similar to the embodiment shown in FIG. 3, screens 610 and 620 are attached to panel purlins 115 for a relatively uniform space between the screens and the back side of the solar panels. The first screen 610 comprises a first edge overhang 612 extending beyond the solar panel 602 and a first central overhang 614 extending toward the torque tube 110. The second screen 620 comprises a second edge overhang 622 extending beyond the solar panel 603 and a second central overhang 624 extending toward the torque tube 110. The edge overhangs and the central overhangs ensure full-width protection.

It shall be noted that the screens described in various embodiments in the present invention may be formed screens having a pre-determined structural layout comprising one or more overhangs with desired bend angles. The formed screens provide advantages for installation convenience and screen structural robustness. Each formed screen may be securely installed with screws, bolts, metal clips, or other means.

Figure 7:
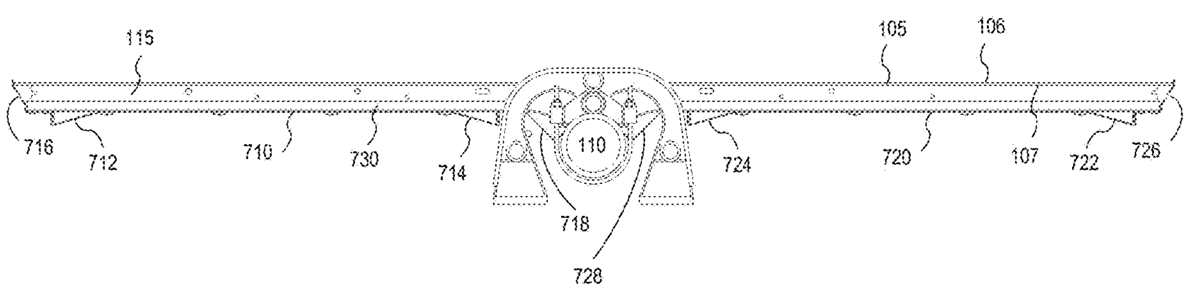
FIG. 7 depicts a side view of yet another embodiment of screen protection, in accordance with various embodiments of the invention.
Figure 8:
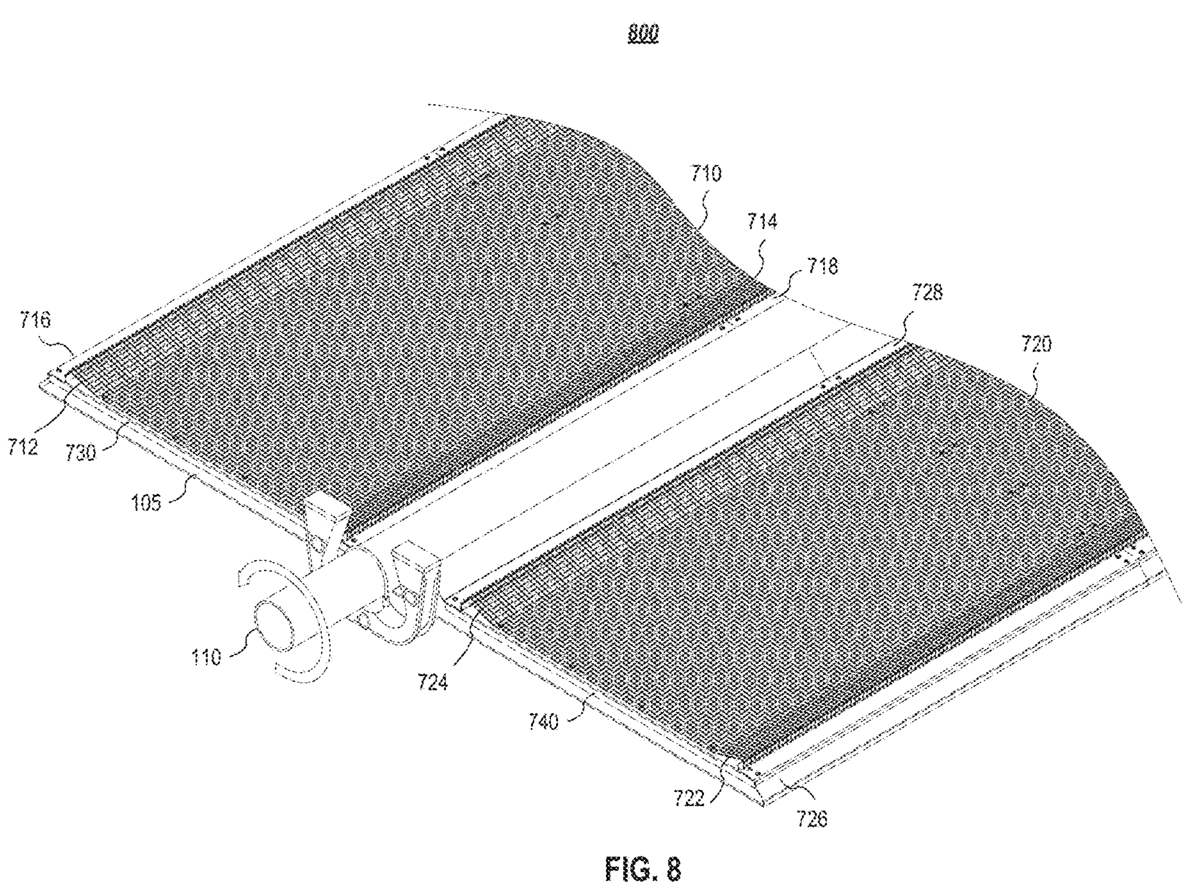
FIG. 8 depicts a close-up view of an embodiment of screen protection, in accordance with various embodiments of the invention.
Figure 9:
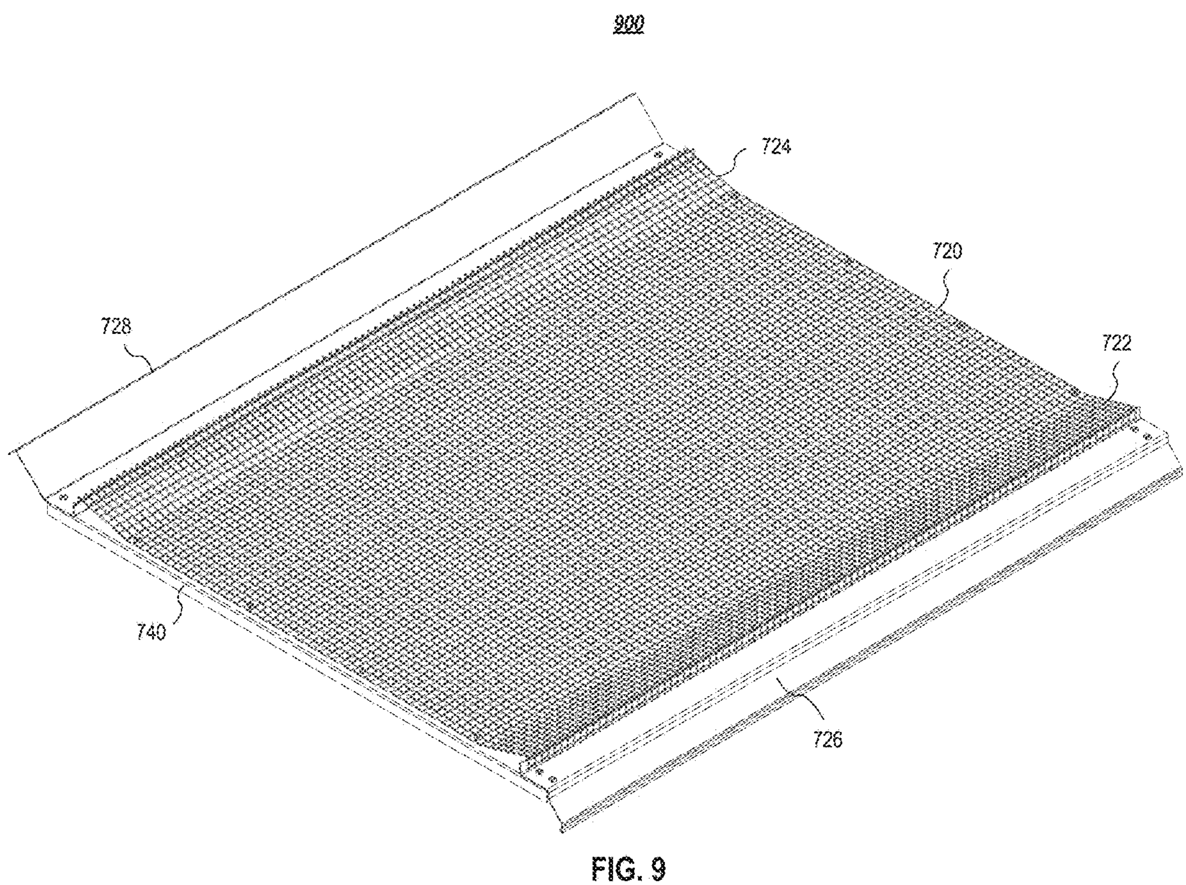
FIG. 9 depicts a detailed view of an embodiment of screen protection, in accordance with various embodiments of the invention.
Figure 10:
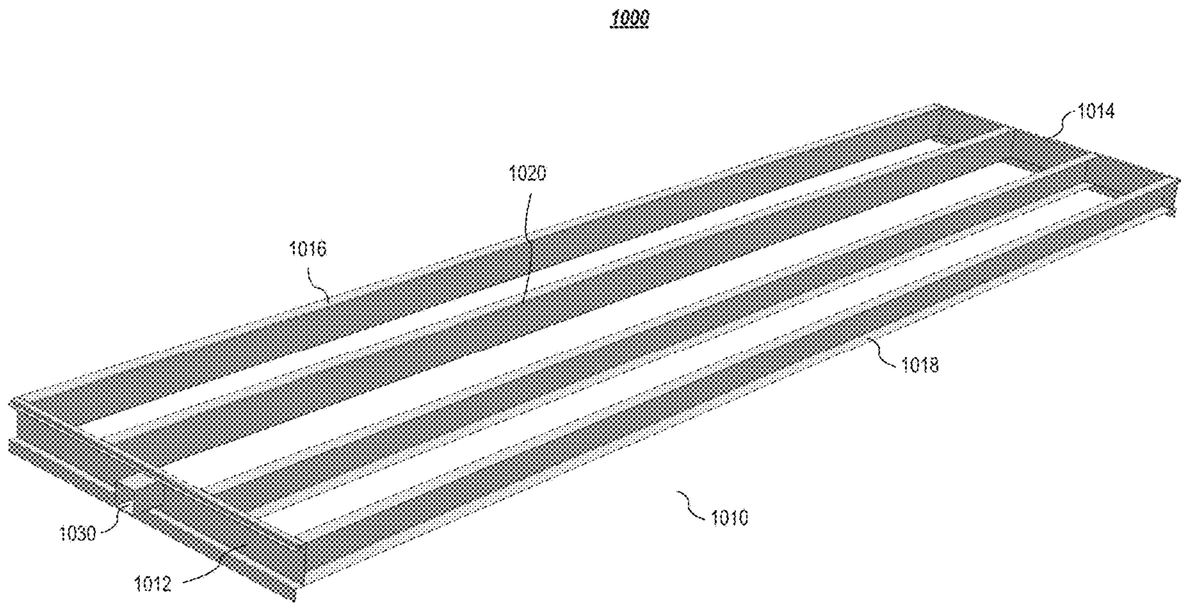
FIG. 10 depicts a perspective view of a solar module frame, in accordance with various embodiments of the invention.

FIGS. 7-9 depict a side view, a close-up view, and a detailed view of yet another embodiment of screen protection, respectively. As shown in the figures, the first screen 710 and second screen 720 are not directly attached to the panel frame 115. Instead, the screens are mounted on one or more supporting frames, which may be made from plastics, aluminum, or any durable materials for outdoor usage. The supporting frames may comprise one or more transverse supporting frames 730/740, which can be attached to solar panel frames or module rails of the solar module via bolted or riveted mounting. The screens 710 and 720 may be attached to the transverse supporting frames 730 via screws, bolts, blind rivets, etc.

In one or more embodiments, the one or more supporting frames may further comprise one or more longitudinal supporting frames, such as a first edge longitudinal supporting frame 716, a first central longitudinal supporting frame 718, a second edge longitudinal supporting frame 726, a second central longitudinal supporting frame 728. As shown in detail in FIGS. 7-9, the first edge longitudinal supporting frame 716 and the first central longitudinal supporting frame 718 are mounted on the transverse supporting frames 730; the second edge longitudinal supporting frame 726 and the second central longitudinal supporting frame 728 are mounted on the transverse supporting frames 740.

The first edge longitudinal supporting frame 716 and the second edge longitudinal supporting frame 726 extend to wrap around the longitudinal edges of the solar panels, thus providing additional edge protection for the solar panels. The first central longitudinal supporting frame 718 and the second central longitudinal supporting frame 728 extend toward the torque tube to protect the solar panels not covered by the screens 710/720. Such extensions for edge and torque tubes ensure full protection for the solar panels.

The screen 710 has a first bend 712 that couples to the first edge longitudinal supporting frame 716 and a second bend 714 that couples to the first central longitudinal supporting frame 718. Similarly, the second screen 720 has a first bend

722 that couples to the second edge longitudinal supporting frame 726 and a second bend 724 that couples to the second central longitudinal supporting frame 728. Similar to the aforementioned screens with one or more overhangs, the screens that are shown in FIGS. 7-9 may also be formed screens pre-manufactured with desired bends having predetermined bend length and angle. The formed screens provide advantages for installation convenience and screen structural robustness.

The protective screens and supporting frames described above provide an excellent solution to address the hail problem for solar farms operating in hail regions. The screens can deflect hail stones or absorb hail impact with a mesh size optimized for hail protection. The mesh configuration allows good air flow for solar panel cooling, which improves solar panel operation efficiency. The screens are lightweight and thus have negligible structural impact on the solar panels. Furthermore, the screens, such as hot-dipped galvanized steel mesh, may achieve 25 years of service life, which is financially attractive for long-term operation. The protective screens and supporting frames may be mounted on solar panels before on-site installation or retrofitted to installed solar panels as an effective remedy for hail protection.

FIGS. 10-15 depict embodiments for solar panel protection using a solar module frame with solar panels and a protective screen attached. As shown in the figures, the solar module frame 1010 is a closed structure comprising a first end frame 1012, a second end frame 1014, a first side frame 1016, and a second side frame 1018. The solar module frame 1010 may further comprise one or more purlins 1020 within the closed structure for structural reinforcement and extra support for solar panels. An adaptor 1030 is disposed on each end frame as a coupling interface to receive a bearing for supporting the solar module frame. The purlins 1020 and the side frames 1016/1018 may be C-channel beams and are flush with the end frames for an even surface for the convenience of solar panel and screen support. The location of the adaptor on the end frame may be decided to ensure that the center of gravity of the solar module frame attached with solar panels and protective screen is on an extended line connecting the adaptors.

Figure 11:
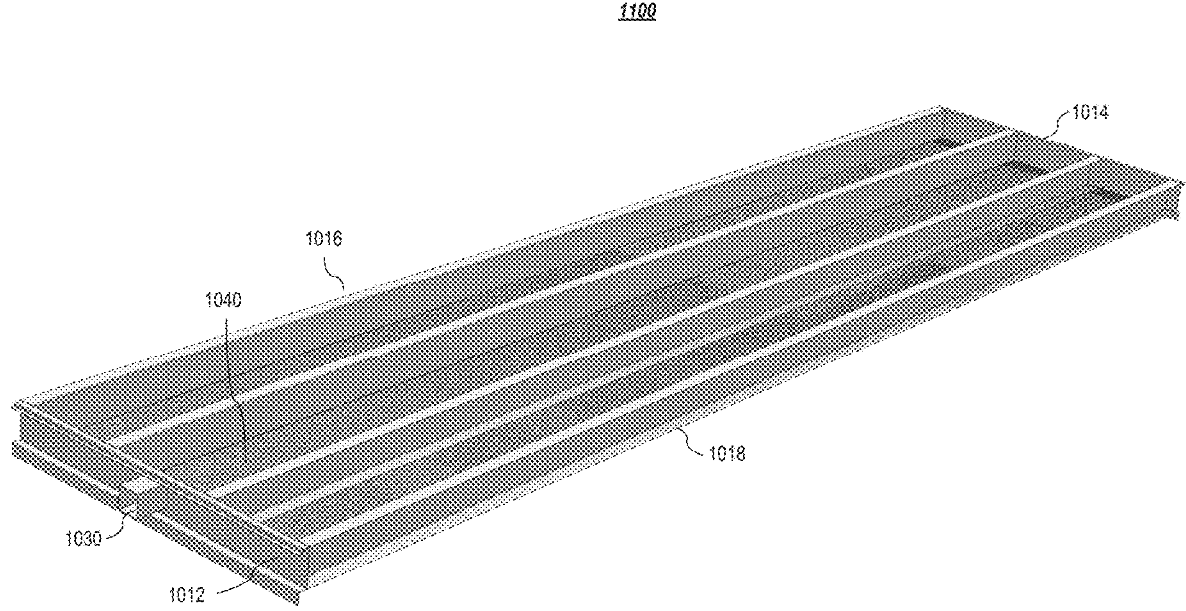
FIG. 11 depicts a perspective view of a solar module frame with a protective screen attached, in accordance with various embodiments of the invention.
Figure 12:
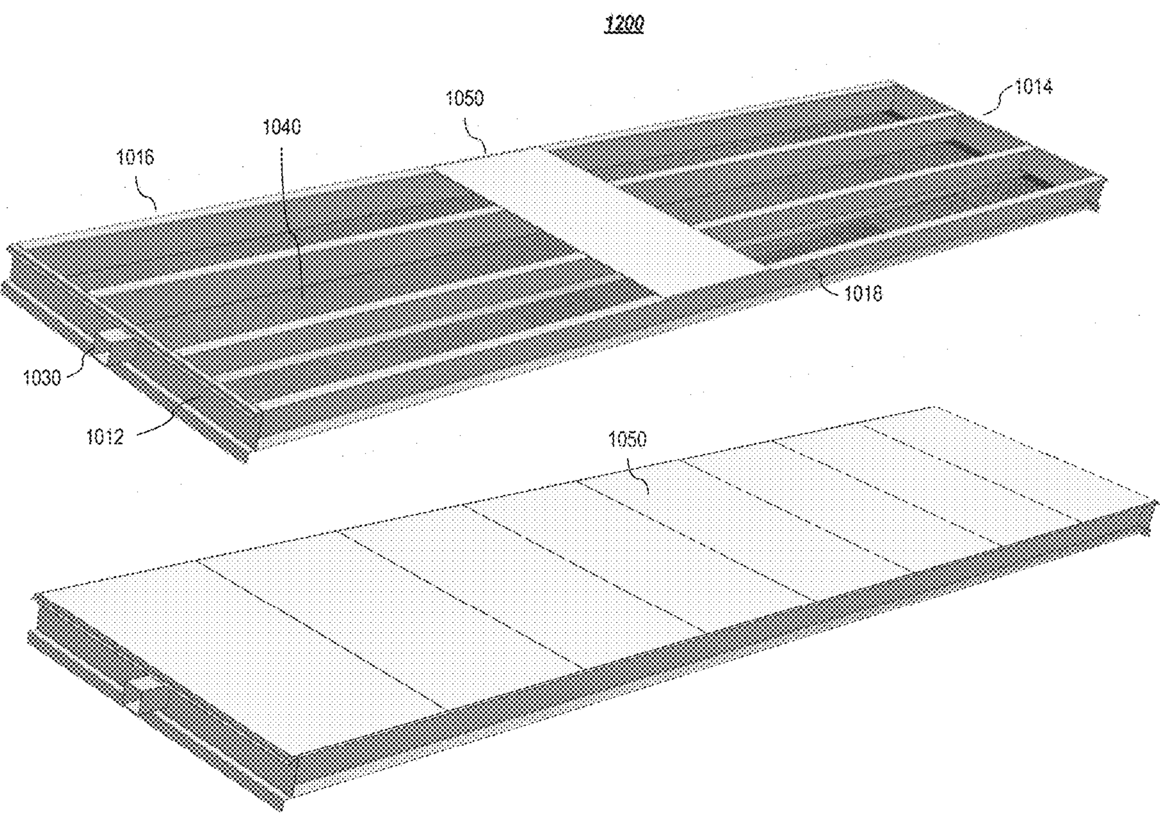
FIG. 12 depicts perspective views of a solar module frame with both a protective screen and solar panels attached, in accordance with various embodiments of the invention.

FIG. 11 depicts a perspective view of a solar module frame with a protective screen 1040 attached to one surface of the solar module frame. FIG. 12 depicts perspective views of a solar module frame with one or more solar panels 1050 attached on an opposite surface of the solar module frame. For the purpose of illustration, FIG. 12 shows, on top, a perspective view of a solar module frame with one solar panel attached and, on the bottom, a perspective view of a solar module frame with multiple solar panels attached. Once the solar panels fully cover the surface opposite to the protective screen, the solar module frame is enclosed to prevent nesting birds or other animals from entering behind the panels.

It shall be noted that the solar module frame may be used to support different types of solar panels. In one or more embodiments, a solar panel may be delivered with built-in panel frames, e.g., a circumferential frame and/or one or more panel purlins. Those panel frames may be used to attach the solar panel to the solar module frame. In other embodiments, a solar panel may be delivered as a frameless laminate. Since the solar module frame has purlins incorporated in the closed structure, the frameless laminate may be attached or glued to the purlins 1020 and the side frames 1016/1018 with adequate structural support. The ability to support frameless laminate solar panels provides cost savings for solar farm construction.

Figure 13:
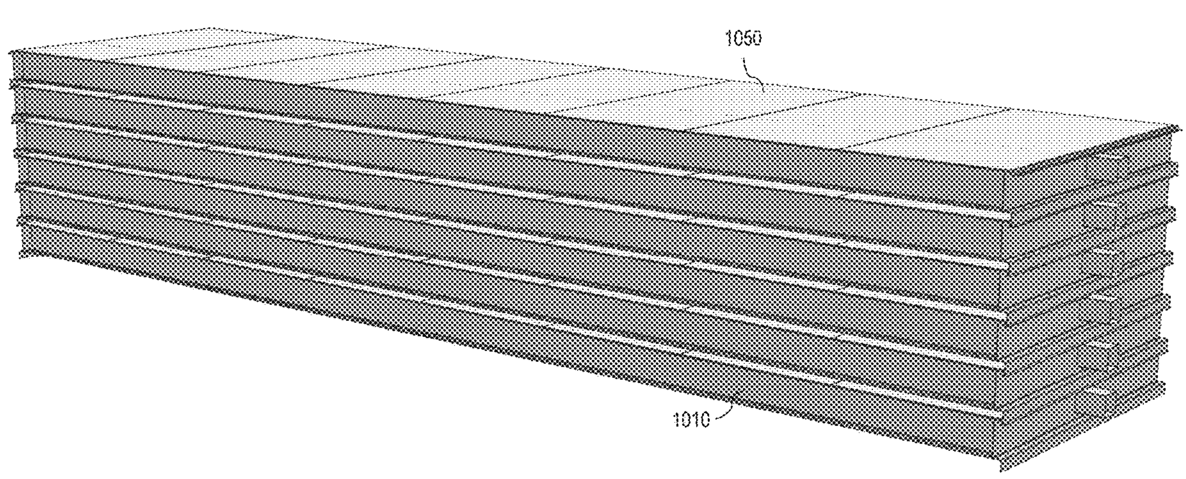
FIG. 13 depicts a perspective view of stacked solar module frames, in accordance with various embodiments of the invention.

The protection screen 1040 is parallel to the solar panels for a uniform space between the solar panels and the screen. The space is determined by the height of the purlins 1020 and the side frames 1016/1018. The parallel layout provides advantages for stacking multiple solar module frames. FIG. 13 depicts a perspective view of stacked solar module frames, in accordance with various embodiments of the invention. As shown in the figures, multiple solar module frames are stacked with each solar module frame having solar panels and a protective screen attached. Therefore, solar module frames may be pre-assembled with solar panels and a protective screen in a centralized factory and be stored with high space efficiency.

Figure 14:
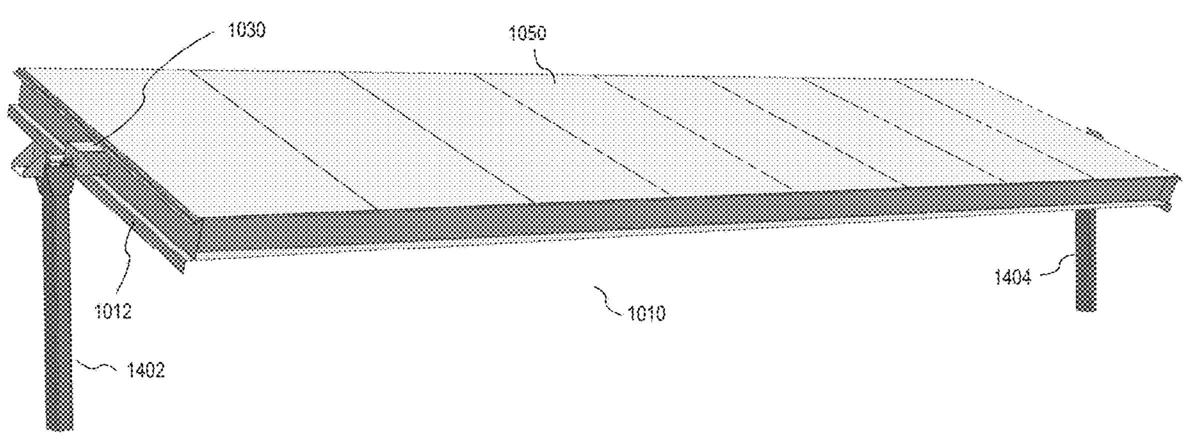
FIG. 14 depicts a perspective view of a solar module frame in an operative position, in accordance with various embodiments of the invention.

FIG. 14 depicts a perspective view of a solar module frame in an operative position, in accordance with various embodiments of the invention. The solar module frame 1010 is pivotably supported by two ground piles 1402 and 1404. As mentioned earlier, the location of the adaptor 1030 on the end frame may be determined to ensure that the center of gravity of the solar module frame, with solar panels and a protective screen attached, is on an extended line connecting the adaptors. Such a setup ensures the solar module frame 1010 may be easily rotated. In an operative position, the solar module frame 1010 is pivoted to have the solar panels orientated upward. The pivot angle of the solar module frame 1010 may be determined according to the geographical location of the solar farm and be a fixed or dynamically adjusted angle.

Figure 15:
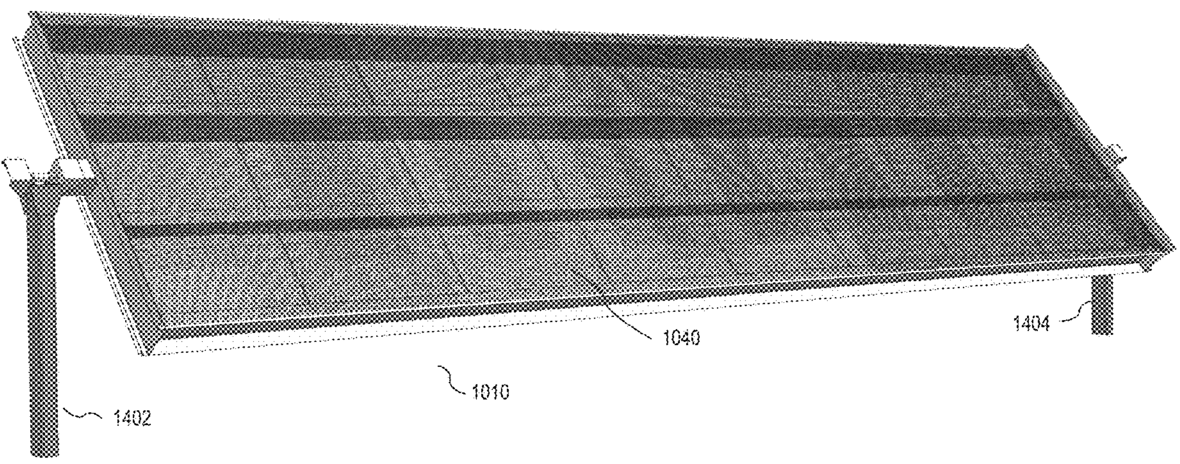
FIG. 15 depicts a perspective view of a solar module frame in a protective position, in accordance with various embodiments of the invention.

FIG. 15 depicts a perspective view of a solar module frame in a protective position, in accordance with various embodiments of the invention. When a hailstorm comes, the solar module frame 1010 is pivoted to a protective position, in which the protective screen 1040 is orientated upward. Since the protective screen is facing upward, hail damage to the solar panels may be eliminated or minimized. The protective screen 1040 may have various screen patterns, e.g., a parallel/perpendicular pattern with screen lines oriented parallel/perpendicular to the purlins. For a high structural strength, it might be desirable to have a diagonal screen pattern with screen lines oriented at an acute angle (e.g., 45 degrees) to the purlins. Such a diagonal screen pattern would also be advantageous to prevent screen twists.

Figure 16:
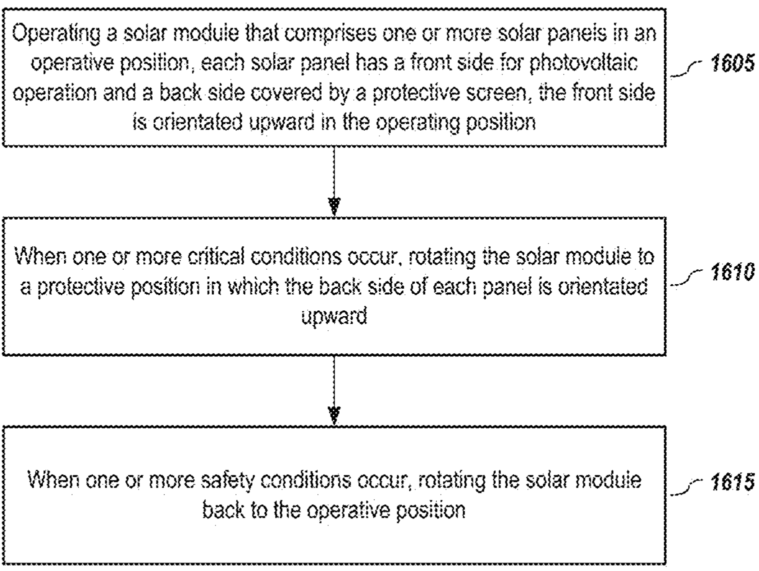
FIG. 16 depicts a process for operating the solar module between an operative position and a protective position, in accordance with various embodiments of the invention.

FIG. 16 depicts a process for operating the solar module in a solar farm between an operative position and a protective position, in accordance with various embodiments of the invention. In step 1605, a solar module comprising one or more solar panels is operated in an operative position. Each solar panel has a front side for photovoltaic operation and a back side covered by a screen for protection. The front side of each solar panel is orientated upward in the operative position. The embodiments of screen protection described above may be applicable herein individually or in combination.

In step 1610, when one or more critical conditions occur, the solar module is rotated to a protective position in which the back side of each panel is orientated upward. The one or more critical conditions may be a projected percentage of hail storms around the solar farm above a critical threshold, a projected percentage of a hurricane pathway toward the solar farm above a critical percentage, etc. Such weather information may be obtained from a weather bureau, e.g., the National Weather Service (NWS). Alternatively, a solar farm operator or administrator may decide to rotate the solar modules into the protective position, given that a weather broadcast may not always be precise. The rotation may be performed manually or automatically. The solar module may also be electrically shut off to prevent fire or shot due to potential hail damage.

In step 1615, once one or more safety conditions occur, the solar module is rotated back to the operative position for photovoltaic operation. The one or more safety conditions may be a projected percentage of hail storms around the solar farm below a safety threshold, a projection percentage of a hurricane pathway toward the solar farm above a safety percentage, etc. The rotation of the solar module may follow a hysteresis loop, e.g., the critical threshold being higher than the safety threshold, to avoid excessive rotation. In one or more embodiments, before the solar module is rotated back from the protective position to the operative position, a visual check may be performed to ensure no significant damage to the front side of the solar panels. Such a precaution may prevent potential fire or shot once the damaged solar panel is back into operation.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A solar module system comprising:

one or more solar panels, each solar panel has a front side for photovoltaic operation and a back side covered by a porous screen, a space exists between the porous screen and the back side of each solar panel;

a torque tube that the one or more solar panels are mounted on, the torque tube is rotatable to place the solar module in an operative position or a protective position;

wherein the front side of each solar panel is oriented upward for photovoltaic operation when the solar module is in the operative position, the back side of each solar panel is oriented upward and covered by the porous screen for protection when the solar module is in the protective position.

2. The solar module system of claim 1 wherein the porous screen is a metal mesh.

3. The solar module system of claim 1 further comprising:

a solar module frame to attach the one or more solar panels on one side and attach the porous screen on an opposite side, the solar module frame has a closed structure.

4. The solar module system of claim 1 wherein the space is uniform or non-uniform across the one or more solar panels.

5. The solar module system of claim 1 wherein the porous screen is a formed screen attached to one or more panel purlines of the solar module, the formed screen comprises an edge overhang extending beyond a longitudinal edge of each solar panel and a central overhang extending toward a torque tube on which the one or more solar panels are mounted.

6. The solar module system of claim 1 wherein the porous screen is a formed screen attached on one or more supporting frames that comprise:

one or more transverse supporting frames attached to solar panel frames or module rails of the solar module, the formed screen is attached to the one or more transverse supporting frames;

an edge longitudinal supporting frame mounted on the one or more transverse supporting frames, the edge longitudinal supporting frame extending to wrap around a longitudinal edge of each solar panel; and a central longitudinal supporting frame mounted on the one or more transverse supporting frames, the central longitudinal supporting frame extending toward a torque tube on which the one or more solar panels are mounted.

7. The solar module system of claim 6 wherein the porous screen comprises a first bend that couples to the edge longitudinal supporting frame and a second bend that couples to the central longitudinal supporting frame.

* * * * *